United States Patent
Naderer et al.

(10) Patent No.: US 12,136,860 B2
(45) Date of Patent: Nov. 5, 2024

(54) ELECTRIC MACHINE HAVING MULTIPLE RIGID WINDING PIECES IN THE FORM OF HOLLOW CONDUCTORS AND HYDRAULIC CONNECTION PART AND SEAL WITH OPPOSING SURFACES

(71) Applicant: DYNAMIC E FLOW GMBH, Valley (DE)

(72) Inventors: Michael Naderer, Salzburg (AT); Nikolaus Schweinert, Kaufbeuren (DE); Manuel Hartong, Kaufbeuren (DE)

(73) Assignee: dynamic E flow GmbH, Valley (DE)

( * ) Notice: Subject to any disclaimer, the term of this patent is extended or adjusted under 35 U.S.C. 154(b) by 629 days.

(21) Appl. No.: 17/295,696

(22) PCT Filed: Nov. 18, 2019

(86) PCT No.: PCT/EP2019/081687
§ 371 (c)(1),
(2) Date: May 20, 2021

(87) PCT Pub. No.: WO2020/104393
PCT Pub. Date: May 28, 2020

(65) Prior Publication Data
US 2022/0021261 A1    Jan. 20, 2022

(30) Foreign Application Priority Data
Nov. 20, 2018   (DE) .................... 10 2018 129 229.5

(51) Int. Cl.
*H02K 3/24* (2006.01)
*H02K 3/22* (2006.01)
*H02K 9/193* (2006.01)

(52) U.S. Cl.
CPC ................. *H02K 3/24* (2013.01); *H02K 3/22* (2013.01); *H02K 9/193* (2013.01)

(58) Field of Classification Search
CPC ........ H02K 3/24; H02K 3/22; H02K 2203/09; H02K 3/38; H02K 3/505; H02K 15/0093;
(Continued)

(56) References Cited

U.S. PATENT DOCUMENTS 2,311,805 A * 2/1943 Yost ..................... H01B 17/306
                                                   310/71
2,786,951 A * 3/1957 William ................... H02K 3/22
                                                   310/64
(Continued)

FOREIGN PATENT DOCUMENTS

DE      10 89 057 B     9/1960
DE       1913219 A1     9/1970
(Continued)

OTHER PUBLICATIONS

International Search Report for Application No. PCT/EP2019/081687 dated Feb. 6, 2020.
1 Examination Report 19805667.3 dated Feb. 2, 2023, 10 pages.

*Primary Examiner* — Maged M Almawri
(74) *Attorney, Agent, or Firm* — Carter, DeLuca & Farrell LLP (57) ABSTRACT

The invention relates to an electric machine (1) having: a rotor (3); a stator (2); multiple winding pieces (5) which are in the form of hollow conductors, form different coils of a winding (4) of the electric machine (1) and are each part of a coolant circuit of the electric machine (1); and multiple external phase connections (L1-L3) which are electrically connected to the winding pieces (5). According to the invention, a hydraulic connection part (15) to which a number of the winding pieces (5) are hydraulically connected, and a seal (27) which has multiple passages (28), in
(Continued)

each of which an end portion (8) of one of the winding pieces (5) is situated, are provided, the hydraulic connection part (15) and the seal (27) having opposing surfaces (29, 30) which rest against each other in order to ensure sealing of the individual connections of the winding pieces (5) to the hydraulic connection part (15).

11 Claims, 7 Drawing Sheets

(58) Field of Classification Search
CPC ............ H02K 15/12; H02K 9/00; H02K 9/19; H02K 9/193; H02K 2213/03
USPC ... 310/60 A, 88, 89, 87, 400, 406, 407, 410, 310/416, 403, 71
See application file for complete search history.

(56) References Cited

U.S. PATENT DOCUMENTS

| | | | | |
|---|---|---|---|---|
| 3,112,415 A * | 11/1963 | Bahn | ............ | H02K 3/22 310/57 |
| 3,308,316 A * | 3/1967 | Pfahl | ............ | H02K 5/132 310/71 |
| 3,335,323 A * | 8/1967 | Molin | ............ | H02K 9/24 361/23 |
| 3,510,700 A * | 5/1970 | Semenovich | ............ | H02K 3/22 310/59 |
| 3,614,493 A * | 10/1971 | Collings | ............ | H02K 3/22 310/58 |
| 4,274,021 A * | 6/1981 | Kamiya | ............ | H02K 3/22 310/260 |
| 4,321,497 A * | 3/1982 | Long | ............ | H02K 3/12 310/260 |
| 4,629,917 A * | 12/1986 | Brem | ............ | H02K 3/22 310/91 |
| 5,793,014 A * | 8/1998 | Sobkowiak | ............ | B08B 7/0042 219/121.85 |
| 5,808,386 A * | 9/1998 | Willyoung | ............ | H02K 3/22 310/58 |
| 5,875,539 A * | 3/1999 | Kilpatrick | ............ | H02K 3/505 310/43 |
| 6,577,038 B2 * | 6/2003 | Butman | ............ | H02K 3/22 310/260 |
| 6,600,247 B1 * | 7/2003 | Stimson | ............ | H02K 5/225 310/71 |
| 6,784,573 B1 * | 8/2004 | Iversen | ............ | B23K 33/00 310/260 |
| 8,040,002 B2 * | 10/2011 | Tartaglione | ............ | H02K 3/22 310/201 |
| 8,129,876 B2 * | 3/2012 | Bresney | ............ | B23K 1/0012 29/596 |
| 10,727,716 B2 * | 7/2020 | Jones | ............ | H02K 5/10 |
| 11,539,256 B2 * | 12/2022 | Diehl | ............ | H02K 3/28 |
| 11,715,987 B2 * | 8/2023 | Ishikawa | ............ | H02K 9/19 310/88 |
| 2014/0265655 A1 * | 9/2014 | Sugihara | ............ | H02K 9/00 310/52 |
| 2018/0048218 A1 * | 2/2018 | Im | ............ | H02K 5/10 |
| 2018/0248443 A1 * | 8/2018 | Jones | ............ | H02K 5/225 |
| 2019/0273415 A1 * | 9/2019 | Jones | ............ | H02K 5/10 |
| 2021/0328472 A1 * | 10/2021 | Diehl | ............ | H02K 3/24 |

FOREIGN PATENT DOCUMENTS

| | | | |
|---|---|---|---|
| DE | 24 16 965 A1 | 9/1975 | |
| DE | 195 02 308 A1 | 8/1996 | |
| DE | 696 06 967 T2 | 8/2000 | |
| GB | 1179553 A | 1/1970 | |
| WO | WO-02063751 A1 * | 8/2002 | ............ H02K 55/04 |
| WO | 2018033307 A1 | 2/2018 | |

* cited by examiner

ELECTRIC MACHINE HAVING MULTIPLE RIGID WINDING PIECES IN THE FORM OF HOLLOW CONDUCTORS AND HYDRAULIC CONNECTION PART AND SEAL WITH OPPOSING SURFACES

The invention relates to an electric machine having a rotor, a stator and multiple winding pieces which are in the form of hollow conductors, form different coils of a winding of the electric machine and are each part of a coolant circuit of the electric machine.

BACKGROUND OF THE INVENTION

Internally cooled electric machines whose winding is manufactured using the so-called pin or hairpin technique are known from the prior art. Pins or hairpins are usually rigid winding pieces produced from copper, which are inserted into grooves of the stator of the electric machine and which generate a magnetic field during operation of the electric machine. In the case of internally cooled electric machines, the winding pieces are designed as hollow conductors that comprise a continuous channel through which a coolant is passed in order to cool the electric machine.

Rigid winding pieces known from the prior art are usually in the form of hairpins or rods. For example, known hairpins comprise two substantially parallel legs and a curved transition region connecting the two legs. On their outer surface, the known winding pieces are usually provided with an electrically insulating layer.

DE 195 02 308 A1 shows, for example, an electric machine with a rotor, a stator and multiple winding pieces designed as hollow conductors. In addition, a hydraulic connection part is provided with connections for multiple winding pieces, to which connections the end portions of the winding pieces are hydraulically connected, as well as a seal which has a plurality of passages in each of which an end portion of one of the winding pieces is arranged. However, the connection part shown in DE 195 02 308 A1 only allows the simultaneous hydraulic connection of all winding pieces to the same coolant circuit. In addition, the connection part is relatively difficult to seal. Other electric machines with an internally cooled winding are known from WO 2018/033 307 A1 and DE 696 06 967 T2.

In electric machines of this kind with a hollow conductor winding formed from rigid winding pieces, the hydraulic connection of the individual winding pieces in particular represents a technical challenge that offers sufficient room for improvement.

OBJECT OF THE INVENTION

It is therefore an object of the present invention to create an electric machine with a hollow conductor winding formed from multiple rigid winding pieces, which electric machine has a particularly simple design, especially with regard to the hydraulic connection of the individual winding pieces.

This object is achieved in accordance with the invention by the features mentioned in the independent claims. Further embodiments of the invention result from the dependent claims.

According to the invention, an electric machine is proposed which comprises a rotor, a stator, multiple external phase connections and multiple winding pieces which are in the form of hollow conductors, form different coils of a winding of the electric machine, and are each part of a coolant circuit of the electric machine. The electric machine according to the invention further comprises a hydraulic connection part having connections for multiple winding pieces, to which connections the end portions of the winding pieces are hydraulically connected, and a seal having a plurality of passages in each of which an end portion of one of the winding pieces is arranged, the hydraulic connection part and the seal having opposing surfaces which rest against each other or are pressed against each other in order to ensure a sealing of the individual connections of the winding pieces to the hydraulic connection part.

The electric machine according to the invention preferably comprises fastening means for pressing the hydraulic connection part and the seal firmly against each other. The fastening means may comprise, for example, one or more screws. The seal and the hydraulic connection part preferably each have a sealing surface pointing in the axial direction of the electric machine. In this case, the two elements are pressed against each other in the axial direction to seal the hydraulic connection of the winding pieces.

The hydraulic connection part is preferably annular in the form of a hydraulic connection ring. It can thus be arranged around the rotor, making the electric machine particularly compact. The seal is preferably also an annular element.

According to a preferred embodiment of the invention, the hydraulic connection part is designed in such a way that winding pieces of coils which are assigned to different electrical phases (U, V, W) are electrically insulated from each other. Thus, winding pieces of different electrical phases can be connected to the hydraulic connection part.

The individual connections of the hydraulic connection part can be designed either to accommodate a single winding piece or for multiple winding pieces.

According to a particular embodiment of the invention, the hydraulic connection part comprises at least one circumferential channel which is fluidically connected to a number of the winding pieces and via which a coolant can be fed into the individual winding pieces or a coolant exiting the winding pieces can be collected.

The at least one channel provided in the connection part is preferably in the form of a groove running around in the circumferential direction. The groove is preferably open in the direction of the seal and is covered by the seal in the assembled state.

The hydraulic connection part is preferably designed in such a way that all winding pieces are hydraulically connected in parallel.

The hydraulic connection part can be made of plastic, for example, but also of metal. Electrical insulation elements can be provided, for example, to electrically insulate the connected winding pieces from the hydraulic connection part.

According to a preferred embodiment of the invention, the electrical insulation is achieved by arranging the ends of the rigid winding pieces at a distance from the hydraulic connection part, thus leaving a free space between each winding piece and the hydraulic connection part. An additional insulator is not required in this case, but could still be provided.

The free space mentioned can be created, for example, by the connection openings provided in the hydraulic connection part having a larger cross-section than the end portions of the individual winding pieces. The end portions of the winding pieces then project into the relevant connection without touching the hydraulic connection part. Alternatively, the individual winding pieces can also be arranged in such a way that they end at an axial distance from the hydraulic connection part.

According to a preferred embodiment of the invention, the seal is made of a potting compound which is poured, in a partially assembled state of the electric machine, into a space in which the end portions of the winding pieces are arranged and which then spreads and hardens around the end portions. In this case, the end portions of the individual winding pieces preferably run through the seal and project in the direction of the hydraulic connection part. The hydraulic connection part can now be placed on the end portions. In the assembled state, the opposite sides of the seal and of the hydraulic connection part lie firmly against each other, which ensures a seal of the hydraulic connections of the winding pieces on the hydraulic connection part.

The individual winding pieces are preferably open at their ends so that the coolant is fed in at one of the ends and discharged at the other end.

The end portions of the individual winding pieces are preferably arranged in multiple rows with different radii in an electric machine according to the invention. They preferably end at approximately the same axial height, i.e. in an axial plane. This makes the electric machine particularly easy to assemble.

The aforementioned hydraulic connection part preferably comprises multiple circumferential channels for distributing or collecting coolant into or out of the individual winding pieces. At least one of these channels is preferably designed in such a way that it communicates fluidically with at least two rows of the end portions of the winding pieces.

The end portions of the individual winding pieces are preferably arranged so as to run through the seal, projecting in the direction of the hydraulic connection part and each dipping into a connection opening of the hydraulic connection part. A connection or a connection opening can be designed to accommodate one or more end portions of winding pieces.

Furthermore, the passages provided in the seal are preferably designed so that the end portions of the winding pieces are tightly received therein.

The end portions of the winding pieces can also be glued in the seal or in the hydraulic connection part.

The present invention also relates to a method for hydraulically connecting a plurality of rigid winding pieces of an electric machine, which are formed as hollow conductors, to a hydraulic connection part which has multiple connections for end portions of the winding pieces, the method comprising the following steps: arranging the end portions in a space; pouring a potting compound into the space, which potting compound flows around the end portions of the winding pieces and after some time hardens and forms a seal, the amount of potting compound being such that the end portions protrude from the seal; and placing the hydraulic connection part on the seal so that the protruding end portions dip into the connection openings or the hydraulic connection part and so that opposing surfaces of the hydraulic connection part and of the seal are pressed against each other to seal the hydraulic connections of the winding pieces.

If necessary, another seal can be inserted between the hydraulic connection part and the seal.

An electric machine according to the invention preferably also comprises multiple contact rings, each of which is designed to electrically connect a number of the winding pieces to one of the external phase connections. With the aid of the aforementioned contact rings, it is particularly easy to contact the relevant connections of the coils or winding pieces and to connect them to their respective associated external phase connections. This is particularly advantageous for electric machines that have multiple coils connected in parallel per phase (U, V, W), i.e. those in which multiple coils connected in parallel are assigned to each electrical phase or each external phase connection.

According to a preferred embodiment of the invention, a contact ring comprises a plurality of connections for electrically contacting winding pieces, these connections preferably being evenly distributed over the circumference of the contact ring.

According to a preferred embodiment of the invention, the electric machine also comprises a set of multiple distribution elements, which are electrically connected to one each of the associated external phase connections.

Each of the distribution elements is preferably electrically connected to one of the aforementioned contact rings via multiple electrical connection elements. In this case, such an electric machine comprises: a set of distribution elements, which distribute the current flowing via the external phase connections co multiple electrical connection elements; said electrical connection elements, which electrically connect the distribution elements and the contact rings; and said contact rings, which each contact a predetermined number of coils connected in parallel. Starting from the external phase connections (L1, L2, L3), the current path in this case leads in each case via a distribution element, multiple electrical connection elements and one of the contact rings to the coils of the winding and then on to a reference potential (e.g. the zero point or another phase).

Said electrical connection elements can, for example, be designed as rod-shaped elements. The connection elements preferably run approximately in the axial direction of the electric machine. They are also preferably evenly distributed around the circumference of the electric machine.

The individual distribution elements preferably have different diameters, which simplifies the design of the electrical circuitry. The distribution elements are preferably embodied as annular distribution rings.

The contact and/or distribution elements are preferably arranged next to each other in the axial direction of the electric machine.

According to the invention, a winding piece formed as a hollow conductor may, for example, have the form of a rod. According to another embodiment of the invention, a winding piece has the form of a hairpin, wherein the winding piece comprises two legs and a curved transition region connecting the two legs to each other. The two legs are arranged substantially in parallel and each preferably have a profile adapted to the cross-section of their respective associated grooves in the stator. A winding piece according to the invention can in principle be dimensioned to fill a groove alone or together with one or more further winding pieces.

A winding piece according to the invention is preferably made of copper, aluminium or an alloy of one of the stated materials. An electrically insulating layer is preferably provided on its outer surface.

The individual coils of the winding are preferably formed from multiple rigid winding pieces which are electrically connected in series.

The above-mentioned distribution elements, the contact rings and the electrical connection elements arranged between the distribution elements and the contact rings may have to carry very high current densities. In order to improve the cooling of the aforementioned components, it is provided in accordance with a special embodiment of the invention that, in addition to the winding, the distribution elements and/or the contact rings and/or the connection elements are also designed as hollow conductors, so that a coolant can be passed through the aforementioned components. The distribution elements, the contact rings and/or the connection elements thus themselves form part of the coolant circuit of the electric machine, whereby the latter can be cooled particularly effectively.

As an alternative to the internal cooling described above, the components mentioned can also be cooled from the outside. For example, the components can be arranged in one or more chambers through which a coolant is passed.

In principle, any component that is subject to high thermal stress can be cooled by appropriate guidance or design of the coolant path. In a hollow conductor design, the individual components can be cooled from the inside. Alternatively, the coolant can also be routed past the outside to cool the component in question. The method of cooling results from the technical requirements and can be easily implemented by a person skilled in the art through practical considerations.

According to a preferred embodiment of the invention, the contact rings each have multiple arms, at each of which at least one of the winding pieces is electrically contacted.

The contact rings mentioned at the outset can, as mentioned, be made of solid metal. According to another embodiment or the invention, the contact rings are made of a printed circuit board material comprising conductor tracks that make electrical contact with individual winding pieces.

The same or possibly other printed circuit boards may also be provided to electrically connect multiple winding pieces in series to form the coils of the electrical winding.

An electric machine according to the invention may also have at least one contact disc having a plurality of through-openings through which the individual winding pieces are inserted, the contact disc further comprising electrical connectors via which certain winding pieces are electrically connected in series so as to form the coils of the electrical winding.

The electrical and hydraulic connection of the individual winding pieces is preferably only made on one side of the electric machine. In the case of rod-shaped winding pieces, however, the electrical and/or hydraulic connection of the individual winding pieces can also be made on two sides of the electric machine.

According to a preferred embodiment of the invention, the end portions of the individual winding pieces are preferably arranged in multiple, in particular circular, rows. The end portions are preferably arranged here in parallel and preferably all point in the axial direction of the electric machine. The end portions preferably end at approximately the same axial height, i.e. approximately in the same plane. This greatly simplifies the electrical and hydraulic connection of the winding pieces.

The contact rings and/or the distribution elements are preferably disc-shaped.

BRIEF DESCRIPTION OF THE DRAWINGS

The invention is explained in more detail hereinafter by way of example with reference to the accompanying drawing, in which.

Figure 1:
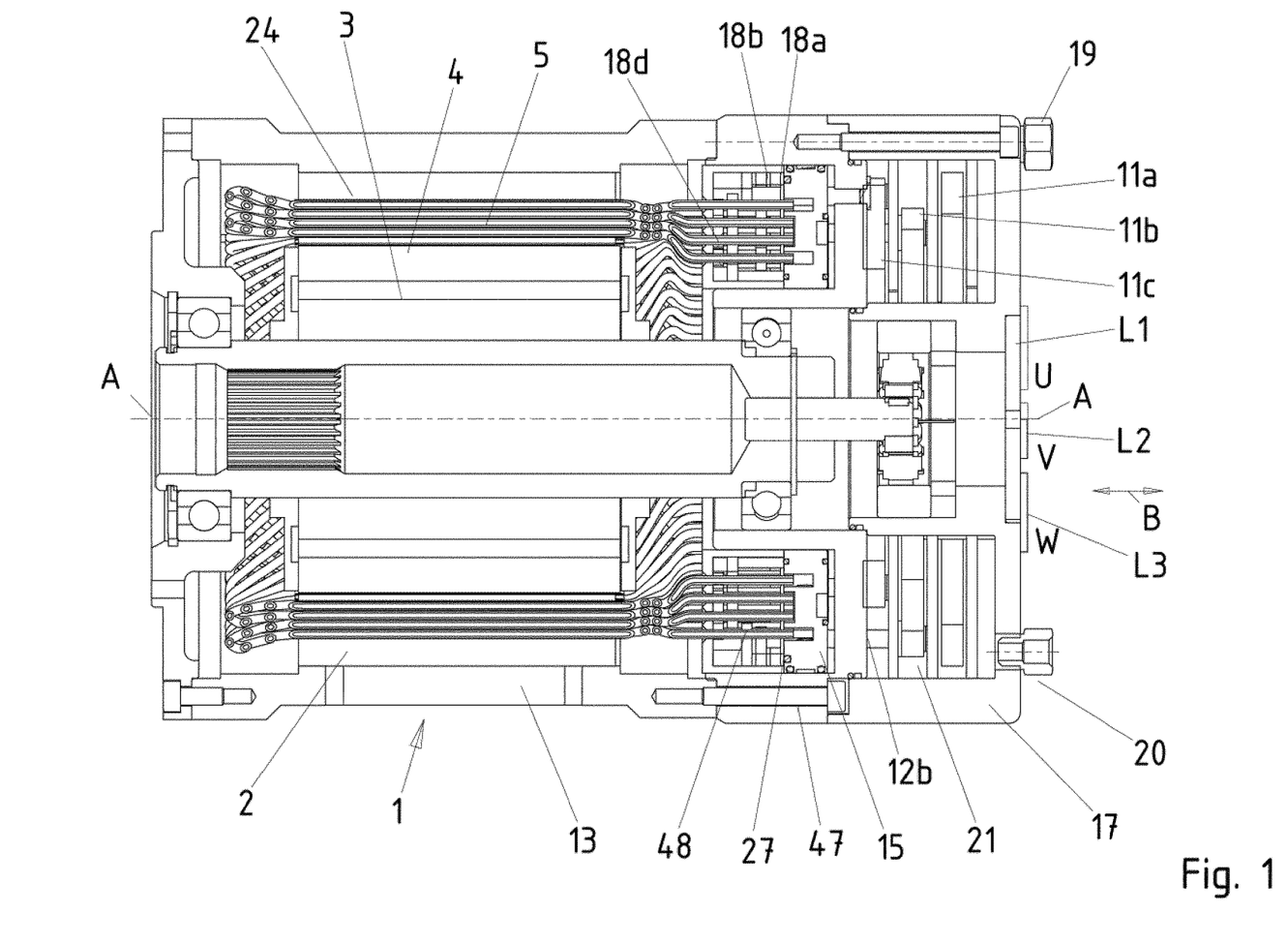
FIG. 1 shows a sectional view of an electric machine with solid metal contact rings according to a first embodiment of the invention.

FIG. 1 shows a sectional view of an electric machine 1 with a stator 2, a rotor 3 and a winding 4 formed from multiple rigid winding pieces 5. The rigid winding pieces 5 are designed as hollow conductors and comprise a continuous channel 9 through which a coolant is passed in order to cool the electric machine 1. The individual winding pieces 5 are connected hydraulically in parallel and are each part of a coolant circuit of the electric machine 1

In the embodiment example of FIG. 1, the winding pieces 5 are each arranged individually in grooves 24 of the stator 2 of the electric machine 1. The cross-section of the winding pieces 5 is adapted to the cross-section of the grooves 24 so that they are accommodated in the grooves 24 with substantially no play. Alternatively, more than one winding piece 5 could also be provided per groove 24.

For example, an oil, Therminol, Galden or carbon dioxide can be used as a coolant.

The electric machine 1 further comprises a housing 13 with a housing cover 17 in which all components of the electrical and hydraulic connection arrangement are housed.

In addition, fastening means 47 are provided, which are designed here as screws and by means of which the housing is screwed. The electric machine is designed in such a way that the tightening of the fastening means simultaneously also presses a hydraulic connection part 15 against a seal 27. The design and function of the components mentioned will be explained in detail below.

Figure 2:
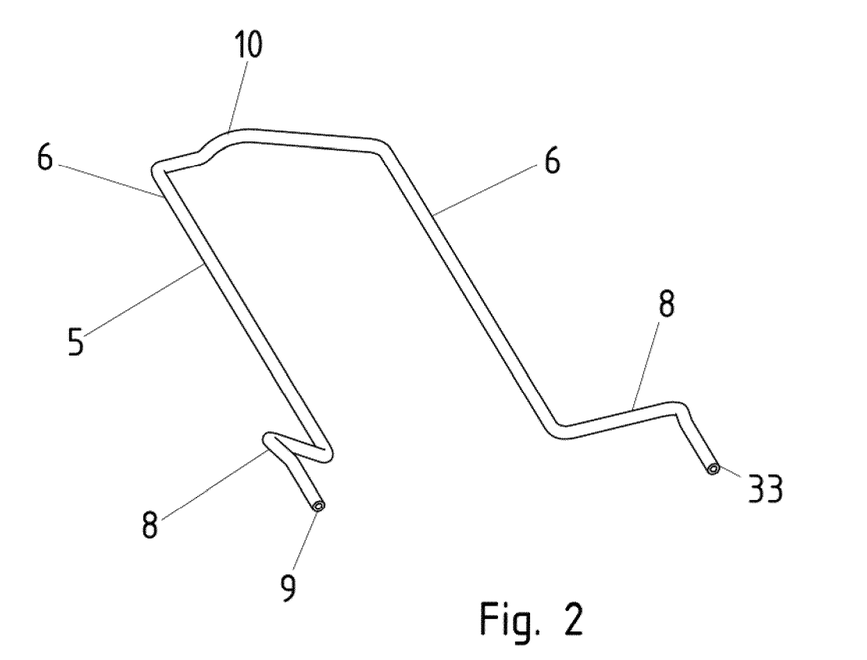
FIG. 2 shows a perspective view of a winding piece of an electric machine in the form of a hairpin.

In the electric machine 1 shown in FIG. 1, the winding pieces 5 are designed as so-called hairpins, as shown by way of example in FIG. 2. The winding piece 5 shown in FIG. 2 comprises two substantially parallel legs 6 and a curved transition region 10 which connects the two legs 6 to each other. The hairpin shown is in the form of a hollow conductor and comprises a continuous channel 9 which passes from one end portion 8 to the other end portion 8 and through which a coolant is passed in order to cool the winding 4 of the electric machine 1 during operation. The hairpin is open at each of its ends 33. One of the ends 33 can thus be used as a coolant inlet and the other end 33 as a coolant outlet.

The winding piece 5 shown in FIG. 2 can be made of copper, for example. It is preferably provided with an electrically insulating layer on its outer surface.

The winding piece 5 can have a round or angular profile, for example. The winding piece 5 can also have a different profile at different portions. According to a preferred embodiment, the profile at the end portions is round.

The electric machine 1 shown in FIG. 1 has a three-phase design and accordingly has three external phase connections L1, L2 and L3, to which the electrical phases U, V and W are fitted. The winding 4 of the electric machine 1 is designed here in such a way that it comprises multiple coils connected in parallel for each electrical phase U, V and W. The individual winding pieces 5 are accordingly electrically connected in such a way that in each case multiple winding pieces are connected in series to form a coil, and multiple such coils belonging to the same electrical phase U, V, W are connected in parallel in each case. According to a particular embodiment of the invention, each phase U, V, W may comprise, for example, eight parallel coils. The winding 4 of the electric machine can of course also have more coils or fewer coils connected in parallel.

The end portions 8 of those winding pieces 5 which are at the phase potential U, V and W are connected to an associated external phase connection L1, L2 or L3 respectively via an electrical contact arrangement, which will be discussed in more detail below.

Figure 3A:
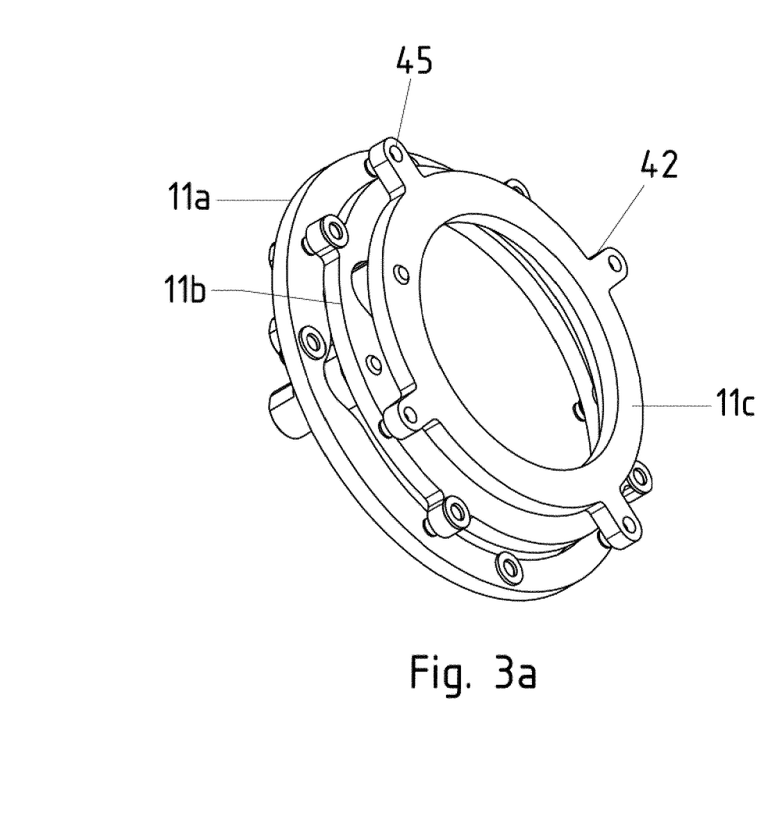
FIG. 3a, 3b show different views of an arrangement formed of multiple distribution elements for dividing the current fed in at the external phase connections.
Figure 3B:
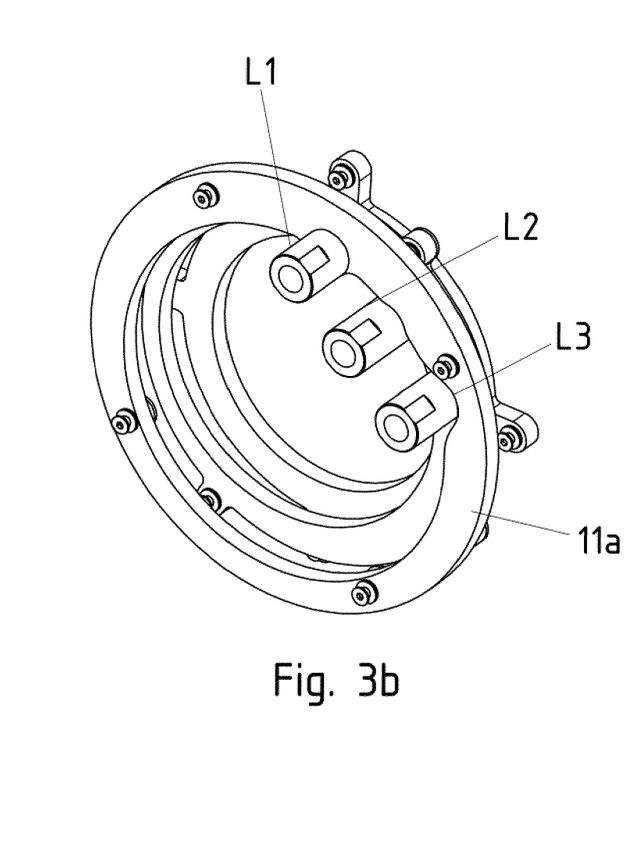

In this embodiment, said electrical contact arrangement comprises a set of three distribution elements 11a, 11b, 11c, as shown by way of example in FIGS. 3a and 3b. Each of the distribution elements 11a, 11b, 11c is electrically connected to one of the external phase connections L1, L2, L3. In the depicted embodiment example, the distribution element 11a is electrically connected to the phase connection L1, the distribution element 11b to the phase connection L2 and the distribution element 11c to the phase connection L3. The three distribution elements 11a to 11c are arranged next to each other in the axial direction B of the electric machine 1 and are electrically insulated from each other.

Each distribution element 11a, 11b, 11c further comprises a plurality of receptacles 45 for electrical connection elements 12a-12d, which are preferably evenly distributed over the circumference of the distribution element. The individual distribution elements 11a, 11b, 11c basically serve to distribute the current suppled at the phase connections L1, L2, L3 over the circumference of the electric machine 1 and to conduct it to the subsequent contact rings 18a-18d. Each of the distribution elements 11a-11d is electrically connected to a corresponding contact ring 18a-18d via multiple electrical connection elements 12a-12d.

Figure 4A:
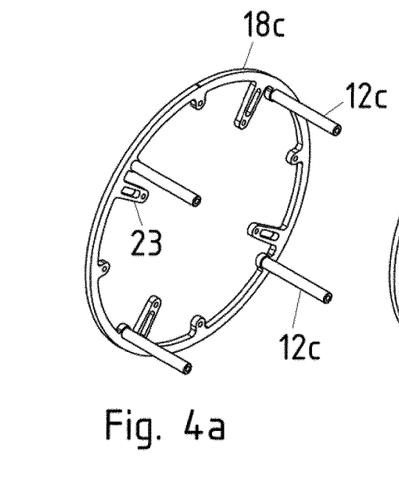
FIG. 4a to 4c show contact rings of the individual phases of an electric machine according to the invention.
Figure 4B:
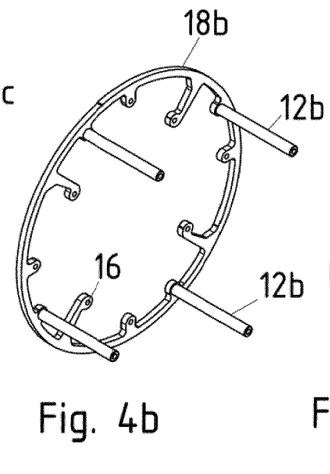
Figure 4C:
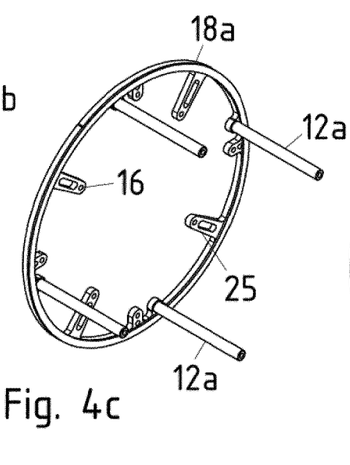

FIGS. 4a-4c show various contact rings 18a-18c according to a specific embodiment of the invention. The contact ring 18a is electrically connected to the associated distribution element 11a and the phase connection L1, the contact ring 18b is electrically connected to the associated distribution element 11b and the phase connection L2, and the contact ring 18c is electrically connected to the associated distribution element 11c and the phase connection L3.

As can be seen in FIGS. 4a-4c, the electrical connection elements 12a-12c are each attached to their respective associated contact rings 18a-18c and are evenly distributed over the circumference of the contact rings 18a-18c. In the assembled state, the contact rings 18a-18c lie substantially transverse to the axial direction B of the electric machine 1, and the electrical connection elements 12a-12c run substantially in the axial direction B.

Each of the electrical contact rings 18a-18c comprises a plurality of arms 23 for electrically contacting end portions 8 of those winding pieces 5 which are fitted to a particular electrical phase U, V or W. In the present embodiment example, each contact ring 18a-18c comprises eight arms 23 for contacting one each of eight winding pieces 5 of eight coils connected in parallel. The arms 23 have a different length in order to contact radially further inward or further outward end portions 8 of the winding pieces 5. Each arm 23 comprises a contact opening 16 through which the end portion 8 of a winding piece 5 is inserted and soldered.

In an electric machine 1 according to the invention, the end portions 8 of the individual winding pieces 5 are preferably arranged in multiple, in particular circular, rows. The end portions 8 of the winding pieces 5 are preferably arranged in parallel next to each other and preferably all point in the axial direction B. The end portions 8 preferably all end at the same axial height, i.e. approximately in the same plane. This facilitates the electrical contacting of the individual winding pieces 5 as well as their hydraulic connection to the coolant circuit.

Figure 5:
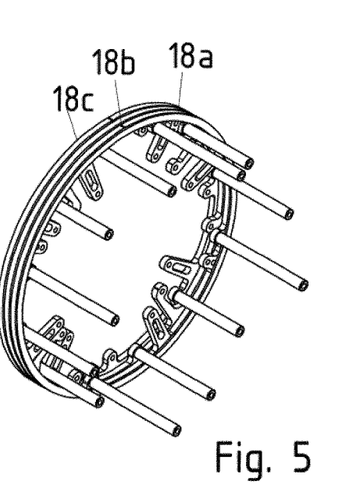
FIG. 5 shows an assembled contact-ring arrangement of the contact rings of FIG. 4a-4c.

FIG. 5 shows the contact rings 18a-18c of FIG. 4a-4c in an assembled state. As can be seen, the individual contact rings 18a-18c are arranged next to each other in the axial direction B of the electric machine 1 and are electrically insulated from each other.

In addition to the electrical connection of individual winding pieces 5 to their respective associated external phase connections L1, L2, L3, it is also necessary to connect certain winding pieces 5 to each other in series to form the coils of the winding 4 of the electric machine 1. For the purpose of series connection, simple electrical conductors can be used, for example, which are soldered between the desired winding pieces.

Figure 6A:
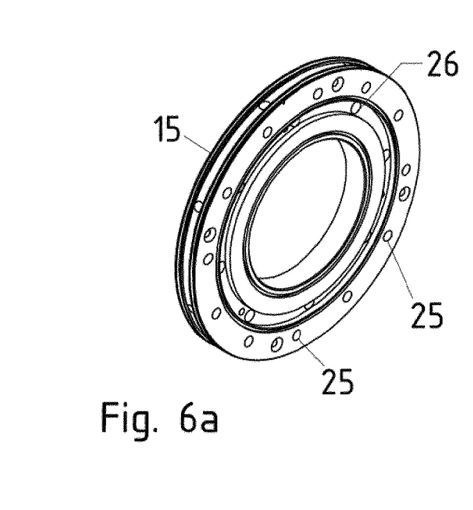
FIG. 6a, 6b show different views of a hydraulic connection part according to a first embodiment of the invention.
Figure 6B:
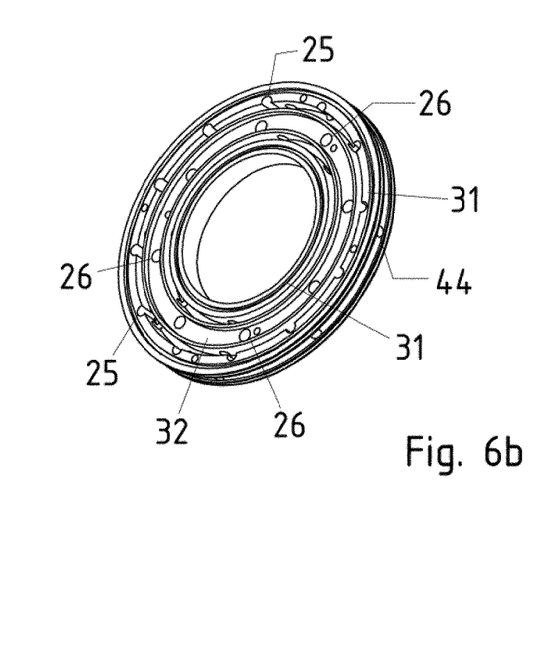

According to a preferred embodiment of the invention, however, an electrical contact disc 39 with electrical connectors 40 is provided, as shown in FIG. 13. Before describing this contact disc 39, the hydraulic connection of the individual winding pieces 5 will first be discussed hereinafter:

FIGS. 6a and 6b show various perspective views of a hydraulic connection part 15 to which all winding pieces 5 are hydraulically connected. The hydraulic connection part 15 comprises multiple connections or connection openings 46, which are designed here as circumferential channels 31 or 32, which are each fluidically connected to a number of the winding pieces 5 and via which a coolant is fed into the winding pieces 5 or a coolant exiting the winding pieces 5 is collected.

The central channel 32 of the hydraulic connection part 15 is wider here than the other two channels 31 and spans two adjacently arranged annular rows of end portions 8. The other two channels 31, one of which is arranged radially outside and one radially inside the central channel 32, are each associated with a single annular row of end portions 8. All channels 31, 32 run substantially over the entire circumference of the hydraulic connection part 15.

In the present case, the coolant is fed into the winding pieces 5 connected thereto via the central channel 32 and exits at the other end of the winding pieces 5 either into the outer channel 31 or into the inner channel 31. In the region of the central channel 32, various passages 26 are provided, through which the coolant enters the channel 32. Furthermore, in the region of the outer channel 31, multiple passages 44 are provided, via which the coolant exits the hydraulic connection part 15. Further inlet or outlet openings can also be provided on the circumferential surface of the hydraulic connection part 15.

The hydraulic connection part 15 further comprises a plurality of passages 25, through which the connection elements 12a-12c between the contact rings 18a-18c and the distribution elements 11a-11c are inserted.

As can be seen in FIGS. 6a and 6b, the individual channels 31, 32 are formed as annular grooves which are arranged in a surface of the hydraulic connection part 15 pointing in the direction of the contact rings 18a-18d. In the first embodiment of the electric machine 1 of FIG. 1, the end portions 8 of the individual winding pieces 5 project into these grooves. The hydraulic connections of the winding pieces 5 are sealed here by means of a seal 27, as shown by way of example in FIG. 7.

Figure 7:
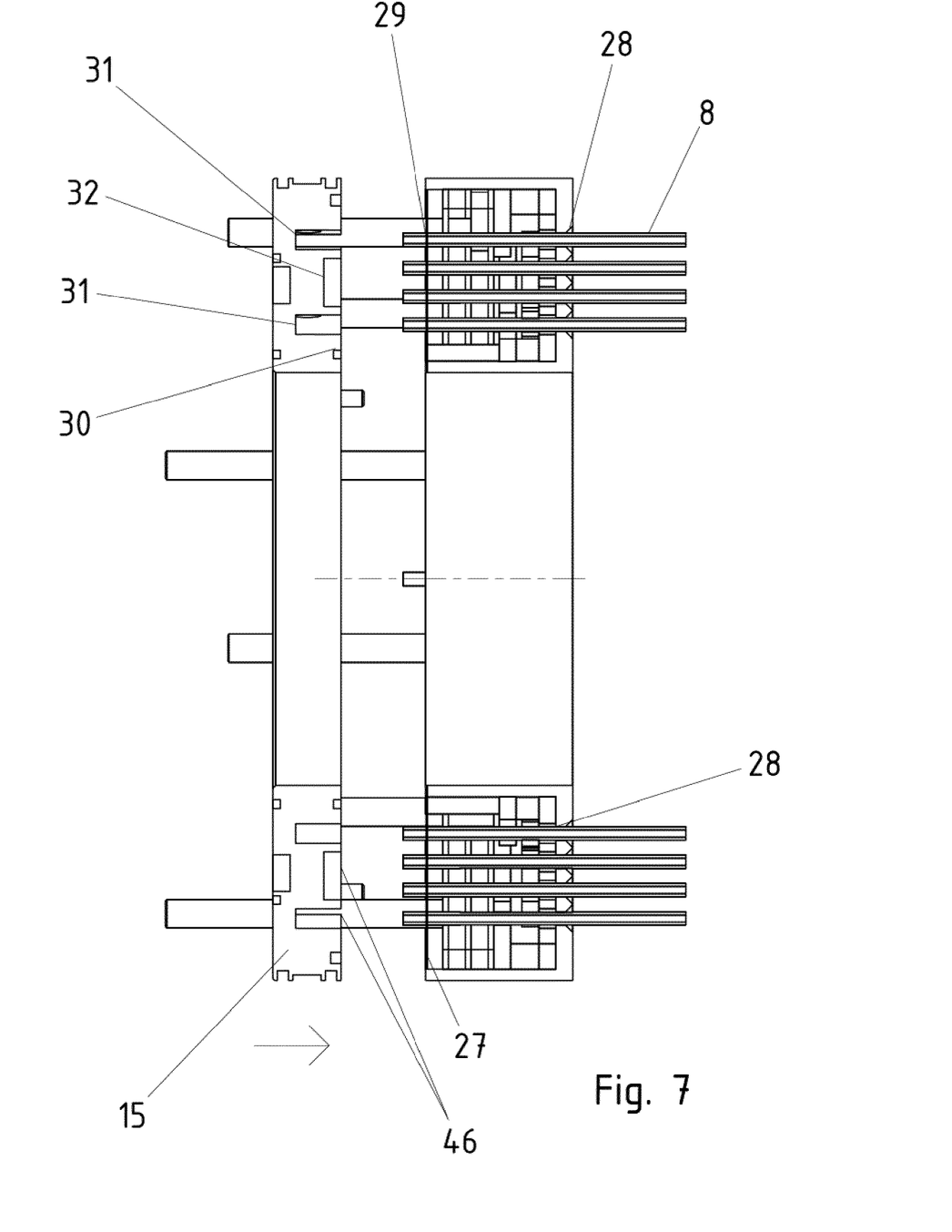
FIG. 7 shows a sectional view of a hydraulic connection part and a seal according to a particular embodiment of the invention.

FIG. 7 shows a seal 27 with multiple passages, each designed to receive an end portion 8 of a winding piece 5. The end portions 8 of the winding pieces 5 are each received with a form fit in the passages 28, which ensures the tightness of the arrangement. Alternatively or additionally, one or more seals (not shown) can also be provided on the seal 27.

The seal 27 and the hydraulic connection part 15 have opposing surfaces 29 and 30, respectively, which are of complementary design (in this case planar) and are pressed firmly against each other when assembled, thereby sealing the hydraulic connections of the individual winding pieces 5.

The seal 27 may, for example, be manufactured as a prefabricated component, e.g. from plastic. According to a preferred embodiment of the invention, the seal 27 comprises a potting compound which is poured into a space 48 in which the end portions 8 of the individual winding pieces 5 are located and then spreads around the end portions 8. After some time, the potting compound hardens and forms the actual sealant, as shown in FIG. 7. The end portions 8 protrude a little beyond the surface 29 of the seal 27. When the hydraulic connection part 15 is now placed on the seal 27 in a next process step, the end portions 8 dip into the various connection openings 46 or channels 31, 32. Coolant can now be fed into the winding pieces 5 or coolant escaping from the winding pieces 5 can be collected via the end faces 33 of the individual winding pieces 5. All winding pieces 5 are preferably connected hydraulically in parallel in the coolant circuit.

In the embodiment example of the electric machine 1 shown in FIG. 1, the coolant flows into the electric machine 1 via a coolant inlet 19 provided on the housing 13 of the electric machine 1 and is fed from there to the hydraulic connection part 15 via one or more channels. There, the coolant enters the central coolant channel 32 from the outside via the passages 26 and is then fed into the end portions 8 of the winding pieces 5 connected fluidically thereto, runs through the individual winding pieces 5 and exits again at the two channels 31. From there, the coolant is guided into a chamber 21 in which the distribution elements 11a-11c are located. The coolant lastly exits the electric machine 1 again at the coolant outlet 20.

The cross-section of the channels 31, 32 is selected in the embodiment example shown so that the end portions 8 of the individual winding pieces 5 can dip into the channels 31, 32 without touching the hydraulic connection part 15. A free space therefore remains between the end portions 8 of the winding pieces 5 and the walls of the channels 31, 32, whereby the end portions 8 are electrically insulated from the hydraulic connection part 15. Additional insulation elements can therefore be provided, but do not necessarily have to be. Furthermore, this makes it possible to manufacture the hydraulic connection part 15 also from an electrically conductive material, in particular metal.

Furthermore, power electronics of the electric machine 1 (not shown) can also be integrated into the coolant circuit and cooled by the coolant. By appropriate design of the coolant path through the electric machine 1, in principle any components can be cooled, if desired. A person skilled in the art will adapt the coolant path appropriately according to the requirements within the scope of his expertise.

Figure 8:
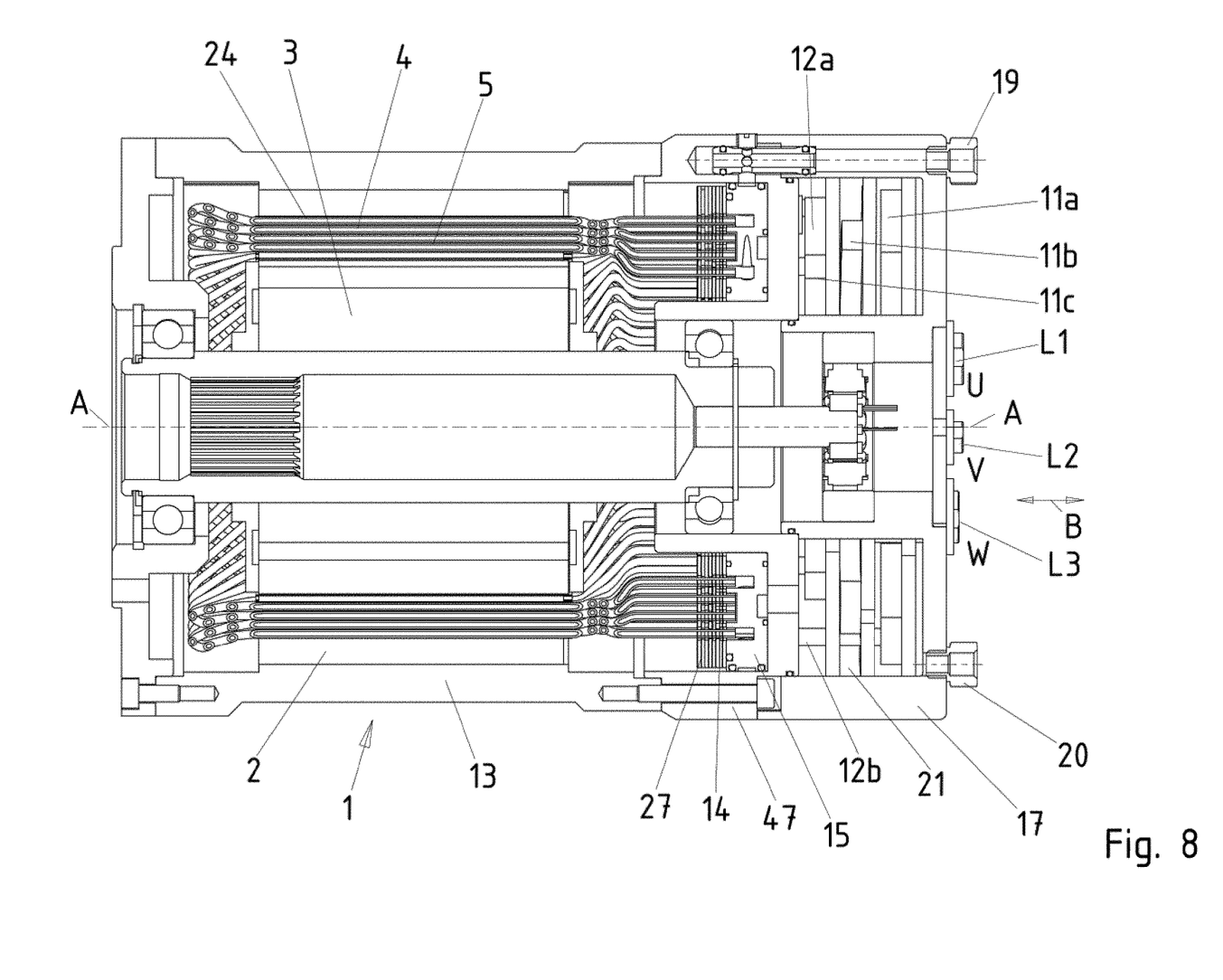
FIG. 8 shows a sectional view of an electric machine with electrical contact rings in the form of printed circuit boards according to a second embodiment of the invention.

FIG. 8 shows a sectional view of an electric machine 1 according to a second embodiment of the invention, which is largely identical in construction to the electric machine 1 of FIG. 1. In contrast to the first embodiment, however, the contact rings 18a-18b are not formed as solid metal rings, but consist of individual printed circuit boards 14a-14d, which are denoted here as a whole by the reference sign 14.

FIG. 9a-9d show perspective views of the aforementioned printed circuit boards 14a-14d. Some of them are contacted by the previously described distribution elements 12a-12c and are thus each electrically connected to one of the electrical phases U, V, W or to an external phase connection L1, L2, L3. The individual printed circuit boards 14a-14d preferably also comprise electrical conductor tracks (not shown) which electrically connect certain winding pieces 5 to each other and connect them in series to form the coils of the winding 4 of the electric machine 1.

Each of the printed circuit boards 14a-14d further comprises a plurality of through-openings 36 for the end portions 8 of the winding pieces 5. Since the winding pieces 5 are inserted through all printed circuit boards 14a-14d, the number of through-openings 36 is the same in each case. The end portions 8 of the individual winding pieces 5 are each soldered to one or more of the circuit boards 14a-14d, depending on the electrical connection.

Figure 9A:
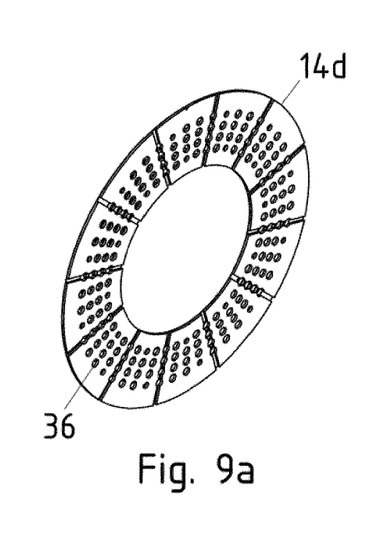
FIG. 9a-9d show various printed circuit boards of an electric machine which serve as contact rings for electrically contacting certain winding pieces of the winding of the electric machine.
Figure 9B:
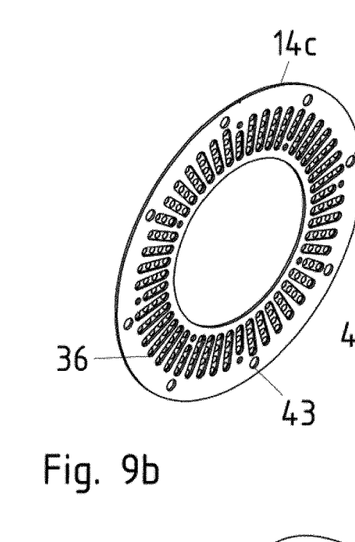
Figure 9C:
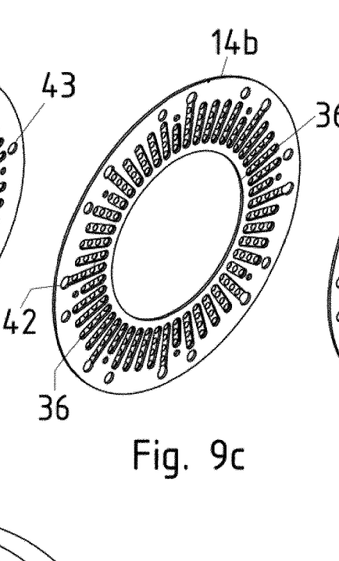
Figure 9D:
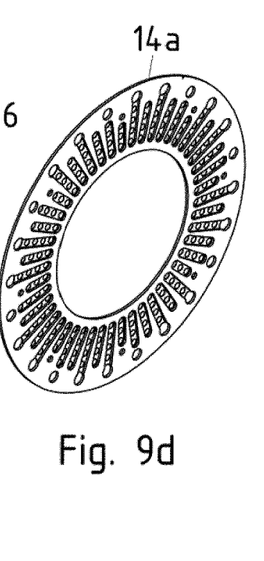
Figure 10:
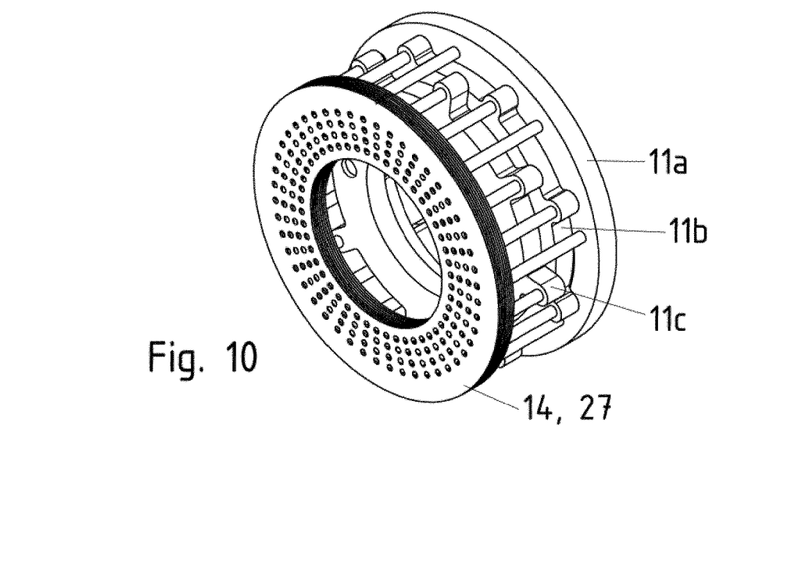
FIG. 10 shows a perspective view of an electrical contact arrangement comprising the distribution elements of FIG. 3a, 3b and the printed circuit boards shown in FIG. 8a-8d.

In the depicted embodiment example of FIGS. 9 and 10, the printed circuit board 14a is arranged opposite the hydraulic connection part 15. This is followed by the individual printed circuit boards 14b, 14c and 14d. Alternatively, more than 4 printed circuit boards can be provided.

In the present case, the printed circuit board 14a is contacted by the connection elements 12a, the printed circuit board 14b is contacted by the connection elements 12b, and the printed circuit board 14c is contacted by the connection elements 12c. The printed circuit board 14d is at zero potential. As can be seen in FIG. 9b-9d, the individual printed circuit boards 14a-14c each have a plurality of through-openings 43 through which the connection elements 12a and/or 12b and/or 12c pass. Due to their arrangement in the printed circuit board stack, the printed circuit board 14a has the most through-openings 43 and the printed circuit board 14c has the least through-openings 43 for connection elements 12a-12c.

Lastly, FIG. 10 shows the entire contact arrangement in an assembled state. The individual printed circuit boards 14a-14d are arranged here in a stack of printed circuit boards 14 and are each electrically connected to one of the electrical distribution elements 11a-11c via associated connection elements 12a-12c.

The outermost printed circuit board 14a is pressed against the hydraulic connection part 15 in the assembled state and thus simultaneously assumes the function of the seal 27 described above, which seals the hydraulic connections of the winding pieces on the hydraulic connection part 15. Optionally, another seal 27 can also be inserted or moulded between the outermost printed circuit board 14a and the hydraulic connection part 15.

The invention claimed is:

1. An electric machine, comprising:
   a rotor;
   a stator;
   multiple winding pieces in the form of hollow conductors which form part of a coolant circuit of the electric machine;
   a hydraulic connection part to which a number of the winding pieces are hydraulically connected, the hydraulic connection part being annular in the form of a ring;
   a seal which defines multiple passages, each passage includes an end portion configured to receive a respective winding piece of the multiple winding pieces,
   wherein:
      the hydraulic connection part and the seal have opposing surfaces which are pressed against each other in order to ensure sealing of the individual connections of the winding pieces to the hydraulic connection part, wherein the opposing surfaces face in an axial direction relative to the electric machine; and
      the hydraulic connection part, in the opposing surface which is pressed against the seal, has at least one annular groove which is in fluid communication with a number of the winding pieces so that a coolant can be fed into the winding pieces or a coolant exiting the winding pieces can be collected in the at least one groove.

2. The electric machine according to claim 1, wherein a fastening member operably associated with the hydraulic connection part is configured to press the connection part and the seal firmly against each other.

3. The electric machine according to claim 1, wherein the seal is made of an electrically insulating material.

4. The electric machine according to claim 1, wherein the seal is designed such that at least a first group of the end portions is electrically insulated from a second group of the end portions.

5. The electric machine according to claim 1, wherein the hydraulic connection part is designed in such a way that the winding pieces connected thereto are hydraulically connected in parallel.

6. The electric machine according to claim 1, wherein the end portions of the individual winding pieces run through the seal and project in the direction of the hydraulic connection part, where they each dip into a connection opening of the hydraulic connection part.

7. The electric machine according to claim 1, wherein the multiple passages provided in the seal are designed so that the end portions of the winding pieces are tightly received at their periphery.

8. The electric machine according to claim 1, wherein the connection openings provided in the hydraulic connection part have a larger cross-section than the end portions of the winding pieces, and in that the end portions are arranged in such a way that they do not touch the hydraulic connection part.

9. The electric machine according to claim 1, wherein the end portions of the winding pieces are glued in the seal.

10. A method for the hydraulic connection of multiple rigid winding pieces of an electric machine which are in the form of hollow conductors to an annularly-shaped hydraulic connection part which has multiple connection openings for end portions of the winding pieces, comprising:
    arranging the end portions in a space;
    pouring a potting compound into the space, which potting compound flows around the end portions of the winding pieces and after some time hardens and forms a seal, the amount of potting compound being such that the end portions protrude from the seal; and
    placing the hydraulic connection part on the seal so that the protruding end portions dip into the connection openings of the hydraulic connection part, wherein the opposing surfaces face in an axial direction relative to the electric machine;
    pressing the opposing surfaces of the hydraulic connection part and of the seal against each other in order to seal the connections of the winding pieces to the hydraulic connection part, wherein the hydraulic connection part, in the opposing surface which is pressed against the seal, includes at least one annular groove which is in fluid communication with a number of winding pieces so that a coolant can be fed into the winding pieces or a coolant exiting the winding pieces can be collected in the at least one groove.

11. The method according to claim 10, further comprising inserting a further seal between the hydraulic connection part and the seal.

* * * * *